United States Patent [19]

Takahashi et al.

[11] Patent Number: 4,819,025
[45] Date of Patent: Apr. 4, 1989

[54] IMAGE FORMING APPARATUS

[75] Inventors: Yuji Takahashi, Tokyo; Yoshimi Yamanaka, Kawasaki; Yutaka Ishikawa, Tokyo, all of Japan

[73] Assignee: Canon Kabushiki Kaisha, Tokyo, Japan

[21] Appl. No.: 206,932

[22] Filed: May 31, 1988

Related U.S. Application Data

[63] Continuation of Ser. No. 781,510, Sep. 30, 1985, abandoned.

[30] Foreign Application Priority Data

Oct. 3, 1984 [JP] Japan ................. 59-206152
Oct. 3, 1984 [JP] Japan ................. 59-206153

[51] Int. Cl.⁴ ............... G03G 15/00; G03G 15/01
[52] U.S. Cl. ..................... 355/14 R; 355/4; 355/8
[58] Field of Search ............. 355/14 R, 3 R, 4, 8

[56] References Cited

U.S. PATENT DOCUMENTS

| | | | |
|---|---|---|---|
| 3,958,876 | 5/1976 | Terashima | 355/4 |
| 4,165,165 | 8/1979 | Iwami et al. | 355/4 |
| 4,183,660 | 1/1980 | Bujese | 355/14 R X |
| 4,204,728 | 5/1980 | Goshima et al. | 355/4 |
| 4,490,035 | 12/1984 | Sugiura | 355/8 |
| 4,519,697 | 5/1985 | Takeda et al. | 355/8 X |
| 4,679,073 | 7/1987 | Hayashi | 358/80 |
| 4,734,762 | 3/1988 | Aoki et al. | 358/80 |
| 4,745,466 | 5/1988 | Ikeda . | |

FOREIGN PATENT DOCUMENTS 59-188628 10/1984 Japan ................. 355/14 C

Primary Examiner—A. C. Prescott
Attorney, Agent, or Firm—Fitzpatrick, Cella, Harper & Scinto

[57] ABSTRACT

An image forming apparatus comprises document scan means for scanning a document a plurality of times to reproduce an image, image forming means for forming the image scanned by the document scan means onto a recording medium, and control means for controlling the document scan means to reinitiate the scan by the document scan means when a scan error of the document scan means is detected.

16 Claims, 10 Drawing Sheets

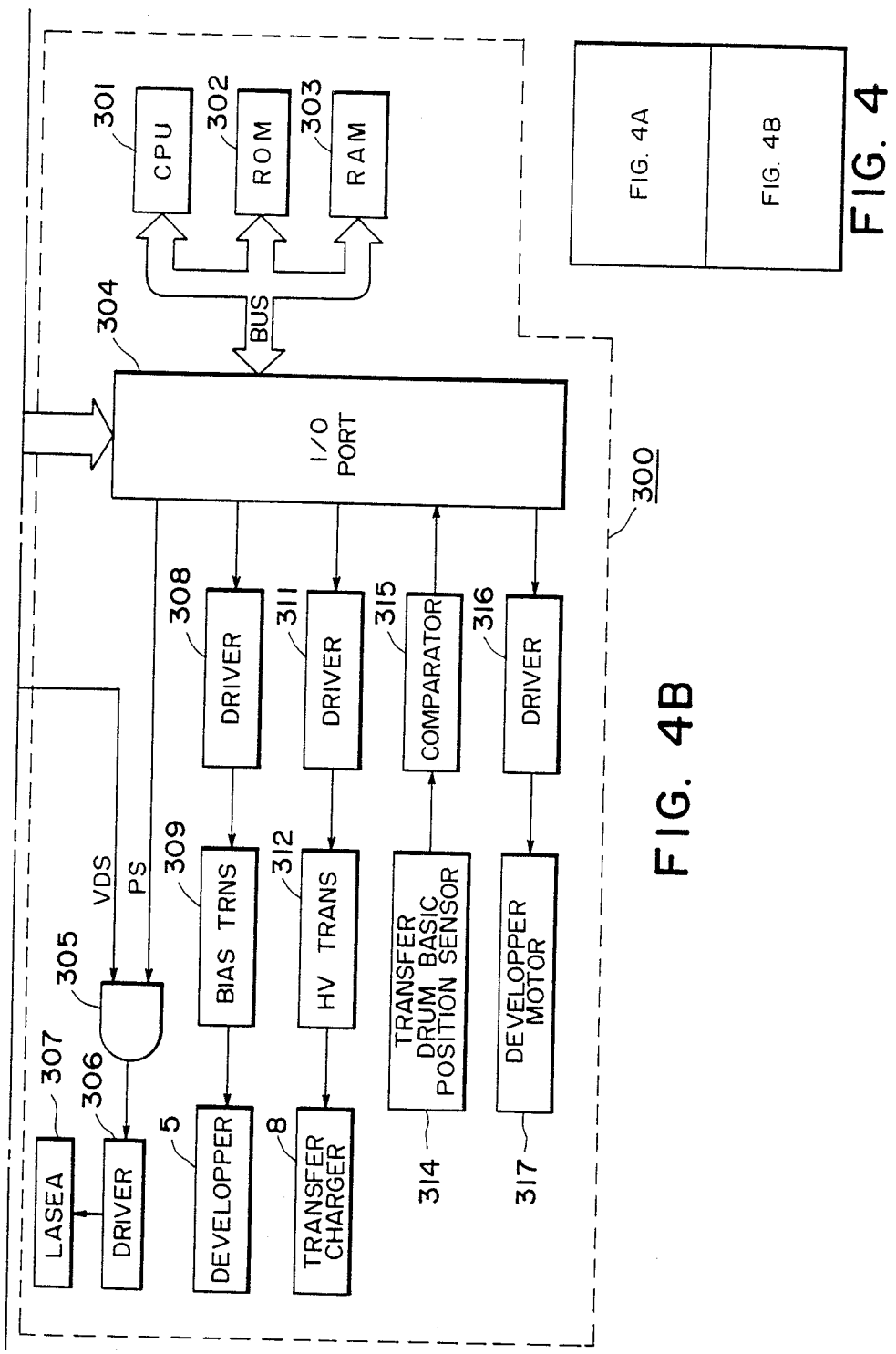

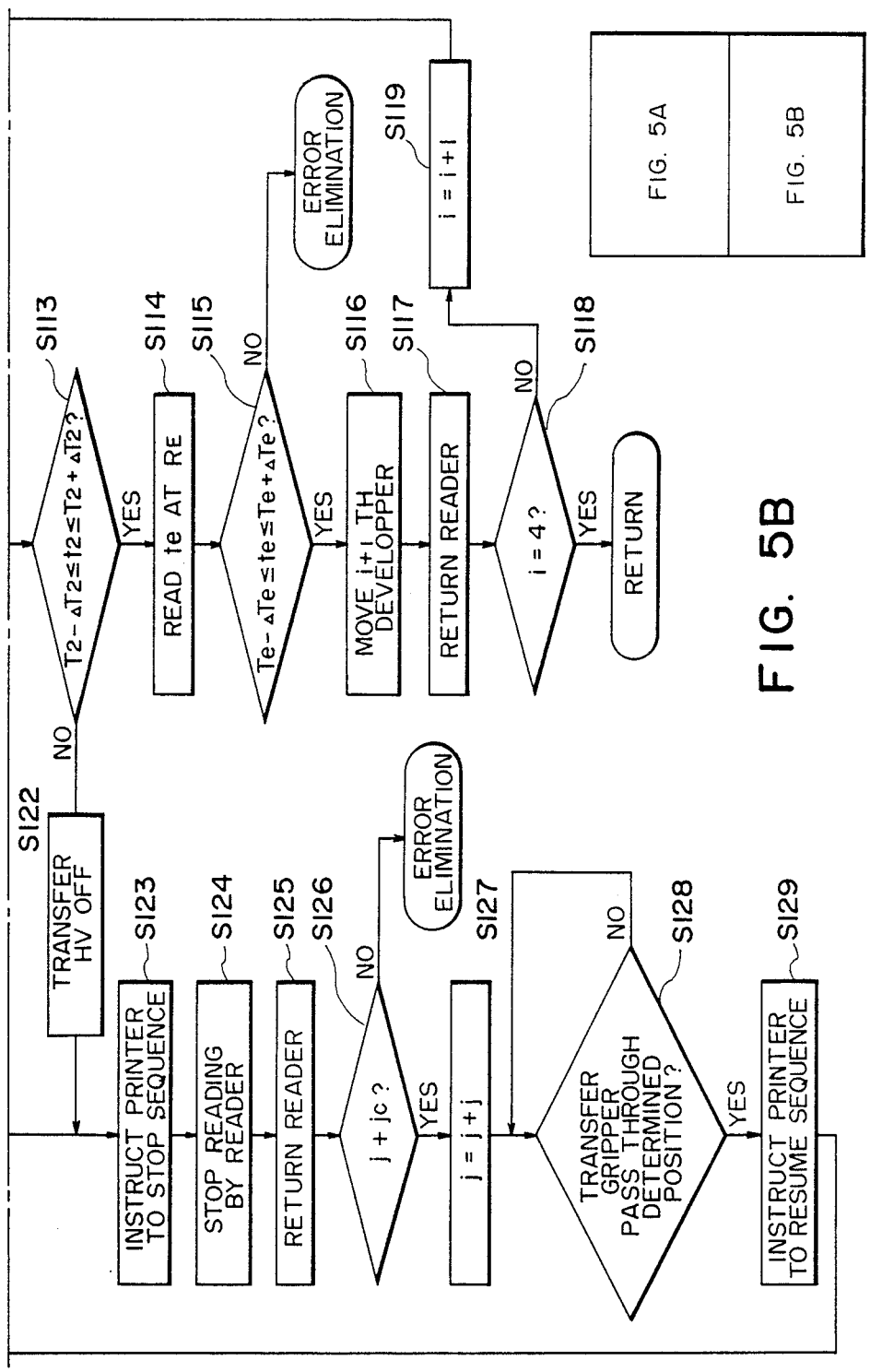

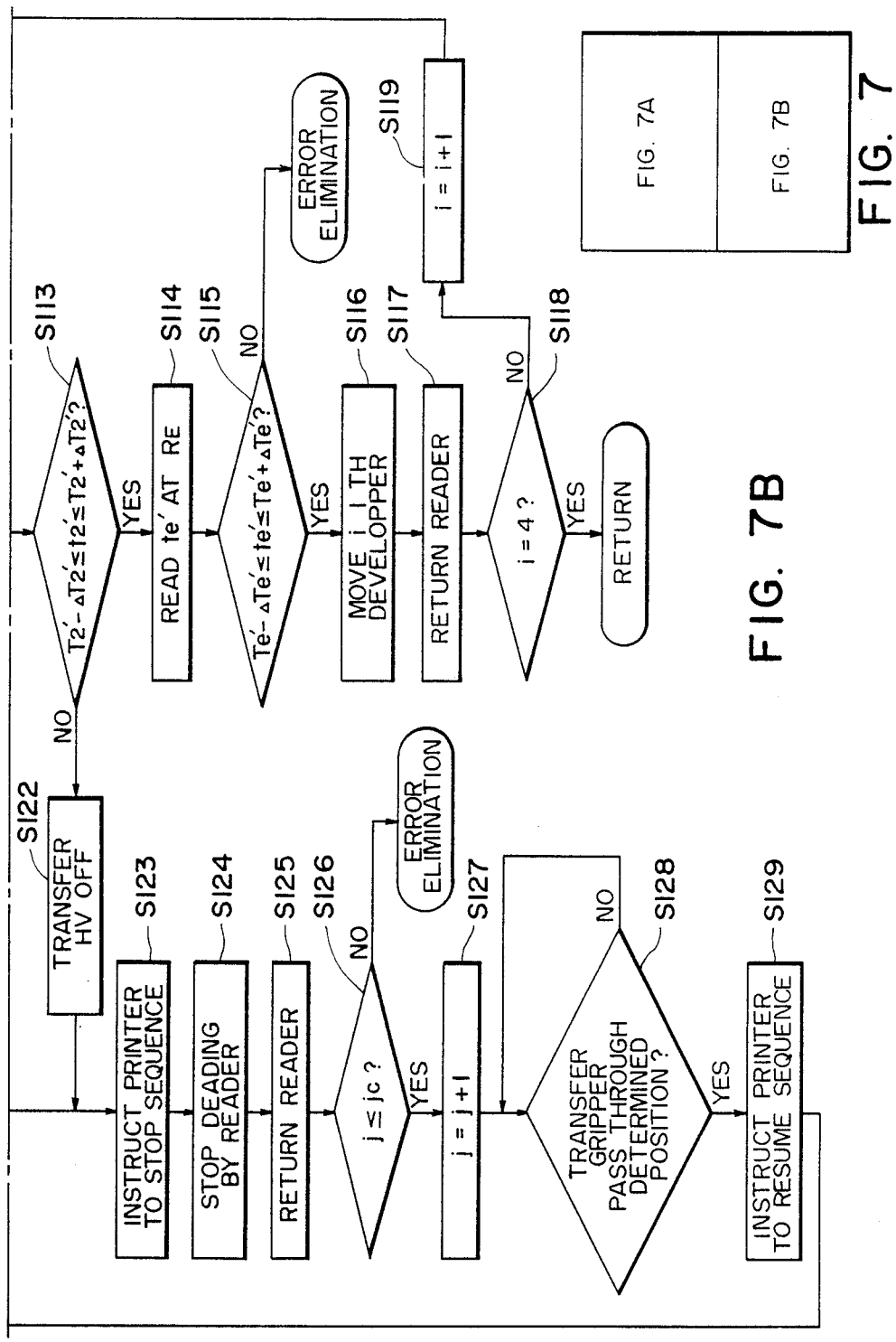

IMAGE FORMING APPARATUS

This application is a continuation of application Ser. No. 781,510, filed Sept. 30, 1985 now abandoned.

BACKGROUND OF THE INVENTION

1. Field of the Invention

The present invention relates to an image forming apparatus for forming an image on a recording medium, and more particularly to an image forming apparatus suitable for a color copying machine.

2. Description of the Prior Art

In a color image reading system in a document reader of a prior art color copying machine, three color-decomposed signal data for blue(B), green(G) and red (R) are produced in one scan of the document and those signal data are temporarily stored in memories for use in color printing, or the document is scanned a plurality of times one for each of the three primary colors, B, G and R to effect the color printing.

In the former one-scan system, the signal data for the three colors are produced in one scan and no color shift during the scan takes place. But, it requires a relatively large capacity of memory and a cost is high. On the other hand, in the latter plural-scan system, the temporary memory is not required but there is a problem of ununiformity of document readout in the plurality of scans.

The ununiformity in the document scan (readout) is considered to be due to a change of a viscosity resistance in a drive unit of a document reader, a change of a sliding friction, a change of a load, an expansion of a drive wire and a vibration of the drive unit. If the ununiformity is included in the document scan, the colors on a record sheet are misaligned. Eyes of human beings are very sensible to such misalignment.

SUMMARY OF THE INVENTION

It is an object of the present invention to provide an image forming apparatus capable of reproducing a high quality of image.

It is another object of the present invention to provide an image forming apparatus capable of reproducing an image at a high efficiency.

It is another object of the present invention to provide an image forming apparatus capable of reproducing an image with a high fidelity.

It is another object of the present invention to provide a low cost image forming apparatus.

It is another object of the present invention to provide an image forming apparatus which is free from misprint.

It is another object of the present invention to provide an improved color image forming apparatus.

It is another object of the present invention to provide an image forming apparatus capable of reproducing a color image without color misalignment.

It is another object of the present invention to provide an image forming apparatus which eliminates disadvantages encountered in forming a color image.

Other objects of the present invention will be apparent from the following description of the invention.

BRIEF DESCRIPTION OF THE DRAWINGS

FIGS. 7, 7A and 7B are flow chart showing a control operation in a second embodiment.

DETAILED DESCRIPTION OF THE PREFERRED EMBODIMENTS

Figure 1:
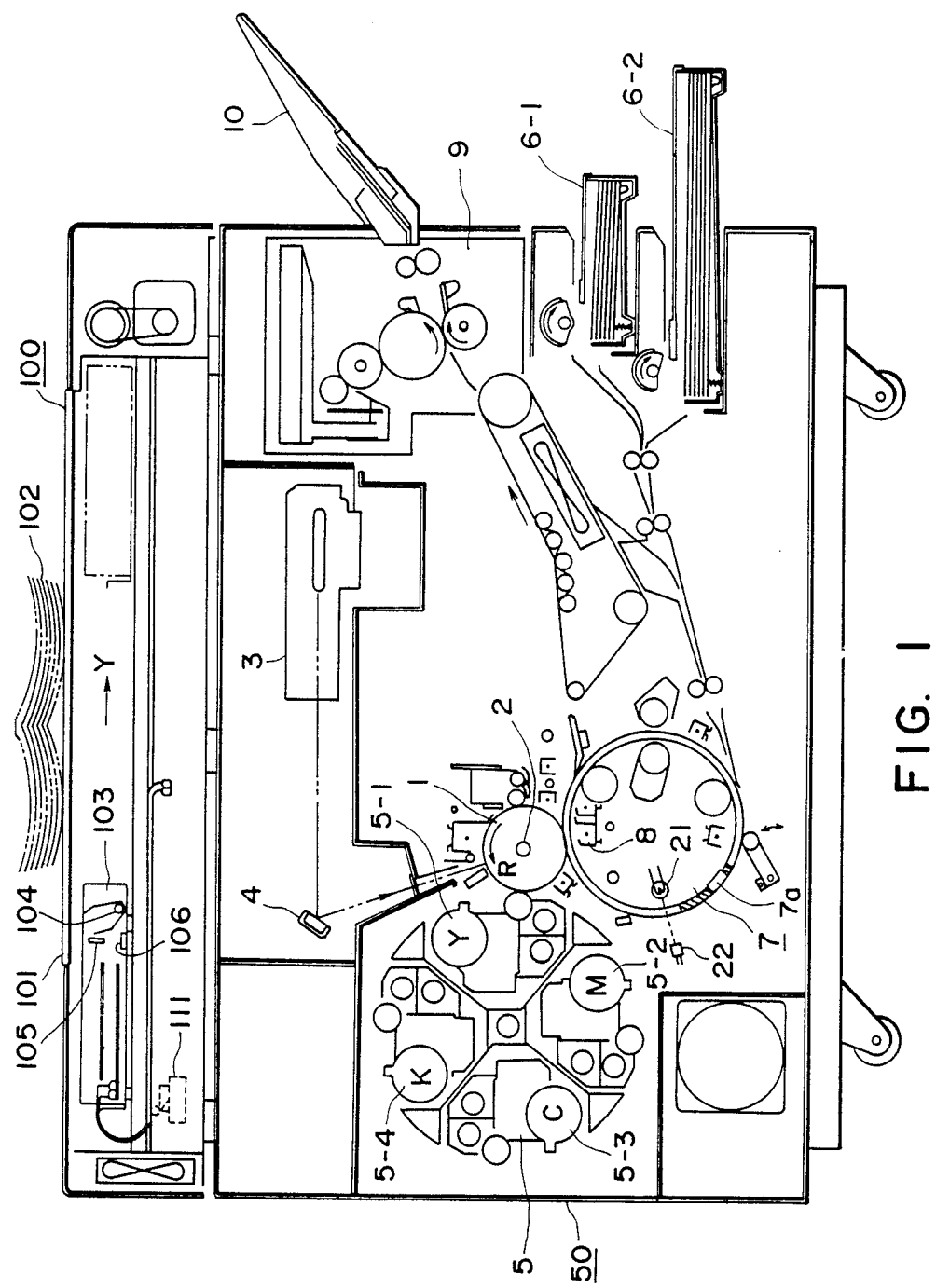
FIG. 1 shows an internal construction of a color image forming apparatus to which the present invention is applied.

FIG. 1 shows an internal construction of a color image forming apparatus to which the present invention is applied. A printer 50 is first explained. Numeral 1 denotes an electrophotographic photoconductor drum having a photosensitive layer such as non-crystalline selenium on a surface thereof. It is rotatably supported by a shaft 2 and rotated in a direction of an arrow in response to a copy command from a control unit to be described later. Numeral 3 denotes a scanner which includes a semiconductor laser (see FIG. 4) for converting an electrical signal to an optical signal and a rotating polygon mirror for horizontally scanning the photoconductor drum, numeral 4 denotes a reflection mirror for altering a light path, and numeral 5 denotes a developing unit for visualizing a patent image on the photoconductor drum 1 by toner. The developing unit 5 comprises a yellow developer 5-1, a magenta developer 5-2, a cyan developer 5-3 and a black developer 5-4 mounted on the same rotary shaft. Numerals 6-1 and 6-2 denote paper cassettes in which copy sheets are contained, numeral 7 denotes a transfer drum which contacts to an outer periphery of the photoconductor drum 1 through the sheet, numeral 8 denotes a transfer charger for transferring a toner image onto the sheet, numeral 9 denotes a fixing unit for fixing the toner image on the sheet by heat-pressing, and numeral 10 denotes a tray in which the fixed record sheets are stacked. Numeral 21 denotes a lamp, and numeral 22 denotes a photosensor. Those two elements constitute a transfer drum reference position sensor 314 (see FIG. 4) to be described later.

A reader is now explained. Numeral 100 denotes the reader, numeral 101 denotes a document glass on which a document is mounted, numeral 102 denotes the document sheet, numeral 103 denotes a scan table for scanning the document sheet 102, numeral 104 denotes an illumination lamp for illuminating the document sheet 102, numeral 105 denotes a selfoc lens for condensing lights reflected from the illuminated document sheet 102, and numeral 106 denotes a CCD sensor for converting the light signal from the lens 105 to an electrical signal. The elements 104–106 are mounted on the scan table 103 so that they are moved with the scan table.

When the copy command is issued by the control unit (see FIG. 4), the photoconductor drum 1 starts to rotate in the direction of the arrow R, and the scan table 103 of the reader 100 which has been stopped at a home position by a home position sensor 111 starts to move in a direction of an arrow Y.

The document sheet 102 mounted on the document glass 101 of the reader 100 is illuminated by the illumination lamp on the scan table 103, and the reflected light therefrom is focused onto the CCD sensor 106 through the selfoc lens 105. The reflected light image is color-decomposed by a color decomposition mosaic filter (not shown) on the CCD sensor, and the color image signal converted to the electrical signal by the CCD sensor is applied to an image processing circuit (not shown) and temporarily stored in a memory (not shown) for synchronization with the printer. The memory has a capacity to store a plurality of lines of image data.

As the photoconductor drum 1 is rotated by the copy command and a gripper position 7a of the transfer drum 7 comes to a sensor position which comprises the lamp 21 and the photosensor 22, a video signal from the memory is supplied to the semiconductor laser (see FIG. 4) in the scanner 3 which includes the rotating polygon mirror and converted to a light information, which is deflected by the mirror 4 and directed onto the photoconductor drum 1.

The light information applied to the photoconductor drum 1 is formed into a latent image by a known charge process and the latent image is developed by the developing unit 5. As described above, the developing unit 5 comprises the yellow developer 5-1 including yellow toner, the magenta developer 5-2 including magenta toner, the cyan developer 5-3 including cyan toner and the black developer 5-4 including black toner, and has the drive unit for rotating the developing unit around a shaft so that necessary developer colors are obtained in accordance with the color information supplied from the reader 100.

The record sheets are accommodated in the upper cassette 6-1 or the lower cassette 6-2. The record sheet is fed out of one of the cassettes in response to a paper feed signal supplied from the control unit, conveyed to the transfer drum 7 and wrapped around the transfer drum 7 with a leading edge of the sheet being held by the gripper 7a. The transfer drum 7 is driven in union with the photoconductor drum 1, and the toner image on the photoconductor drum 1 is transferred to the sheet by the transfer charger 8 with a synchronization between the position of the sheet on the transfer drum 7 and the position of the image developed on the photoconductor drum 1. The same process is repeated for each of other colors and the color images are superimposed on the same sheet. After the transfer of all color images, the sheet is separated from the transfer drum 7, the images are fixed on the sheet by the fixing unit 9 and the sheet is ejected to the tray 10.

Figure 2:
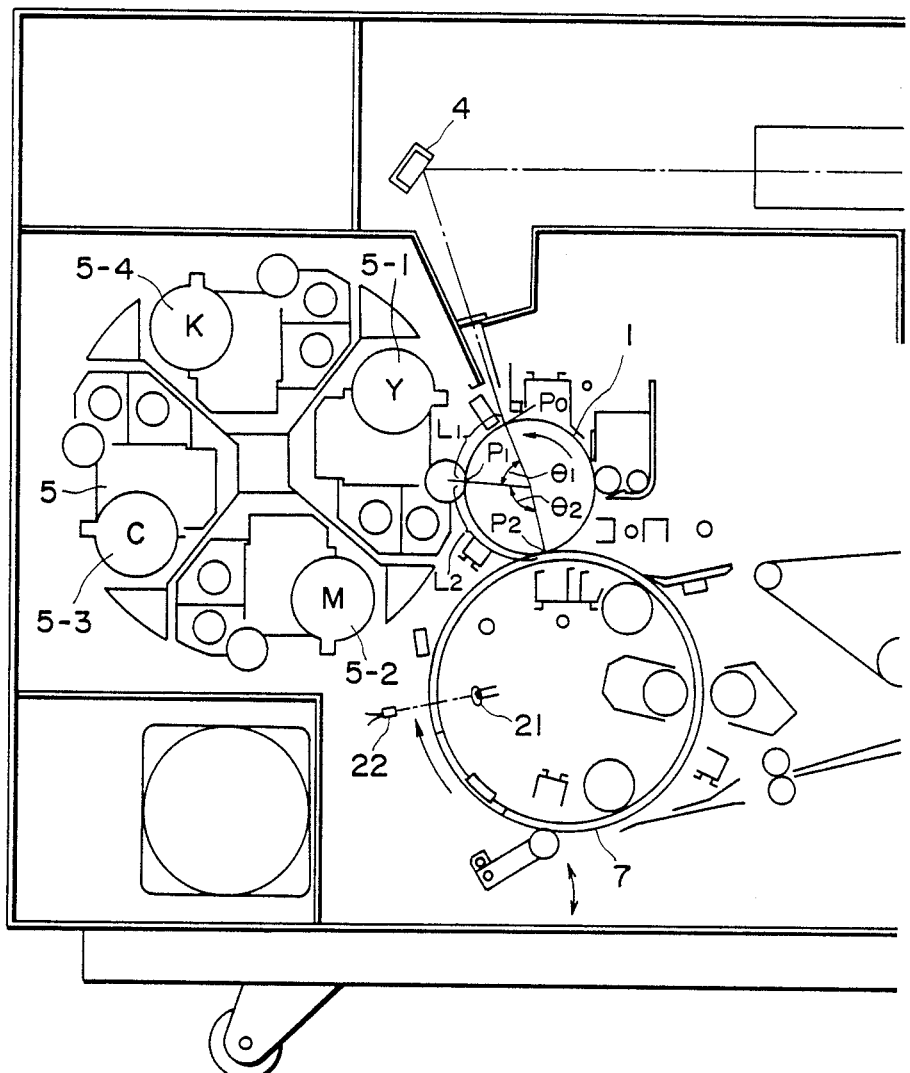
FIG. 2 is an enlarged view of a drum unit and a developing unit of FIG. 1.

FIG. 2 shows an enlarged view of a periphery of the photoconductor drum 1. A point $P_0$ on the photoconductor drum 1 is a laser beam irradiation point, a point $P_1$ is a development start point and a point $P_2$ is a transfer start point. A distance between the points $P_0$ and $P_1$ along the circumference of the drum 1 is represented by $L_1$, and a distance between the points $P_1$ and $P_2$ is represented by $L_2$.

Figure 3:
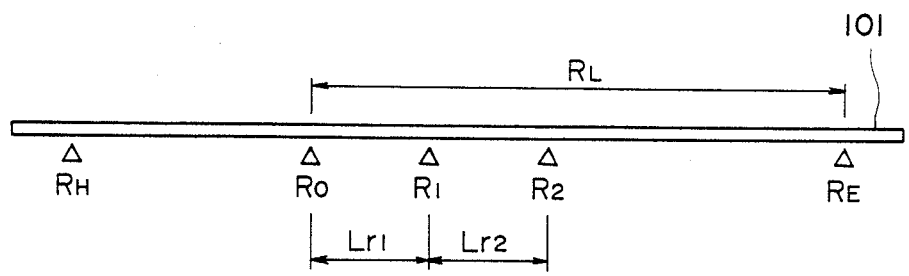
FIG. 3 illustrates scan position of a scan unit in a reader of FIG. 1, FIGS. 4, 4A and 4B are a block diagram of a control circuit for the apparatus of FIG. 1, FIGS. 5, 5A and 5B are a flow chart showing a control operation in a first embodiment.

FIG. 3 shows a scan position relationship of the scan unit 103 of the reader 100. RH denotes the home position which is stop position for the CCD sensor 106. A read start point (leading edge of a document sheet) $R_0$ is located downstream of the point RH, a measuring point R is spaced from the point $R_0$ by $Lr_1$, and a measuring point $R_2$ is spaced from the point $R_1$ by $Lr_2$. An end of movement point RE is spaced from the read start point $R_0$ by RL.

A scan speed of the scan table 103 of the reader is represented by v, and a circumferential speed of the photoconductor drum 1 is represented by V. A time required for the photoconductor drum 1 to move by the distance $L_1$ is represented by $Tp_1$, and a time required to move by the distance $L_2$ is represented by $Tp_2$. $Tp_1$ and $Tp_2$ are given by $$Tp_1 = L_1/V \tag{1}$$

$$Tp_2 = L_2/V \tag{2}$$

On the other hand, a time $Tr_1$ required for the scan table 103 to move by the distance $Lr_1$ and a time $Tr_2$ required to move by the distance $Lr_2$ are given by $$Tr_1 = Lr_1/v \tag{3}$$

$$Tr_2 = Lr_2/v \tag{4}$$

If $Tp_1 = Tr_1$ and $Tp_2 = Tr_2$, the followings are met from the formulas (1)–(4)

$$Lr_1 v/V \cdot L_1 \tag{5}$$

$$Lr_2 v/V \cdot L_2 \tag{6}$$

In the present embodiment, the positions $R_1$ and $R_2$ are selected to meet the relations of the formulas (5) and (6).

The circumferential speed V of the photoconductor drum 1 is usually constant and the scan speed v of the scan table 103 is variable for variable magnification. Accordingly, the points $R_1$ and $R_2$ are not fixed but variable as a function of v. The points $R_1$ and $R_2$ may be determined in the following manner. Output pulses of an encoder (see FIG. 4) which is driven in synchronism with the scan of the scan unit 103 are used to detect the points $R_1$ and $R_2$. A CPU 201 calculates the distances $Lr_1$ and $Lr_2$ based on a magnification and the formulas (5) and (6) and reads out the numbers of pulses $Ln_1$ and $Ln_2$ corresponding to the distances $Lr_1$ and $Lr_2$ from a table (not shown) such as a ROM. Accordingly, the scan unit 103 starts the scan and starts to count the pulses at the read start point $R_0$, and the points $R_1$ and $R_2$, are determined when the count reaches $Ln_1$ and $Ln_2 + Ln_2$, respectively. Since the distance from the home position RH to the read start point $R_1$ is known, the number of pulses corresponding to that distance can be preset. Accordingly, the read start point $R_0$ can also be easily determined by counting the pulses from the home position after the start of the scan. The number of pulses generated during the movement of the distance RL is represented by NL. Times required to scan from the point $R_1$ to the points $R_1$, $R_2$ and RE are represented by $T_1$, $T_2$ and Te, respectively. $T_1$, $T_2$ and Te are given by $$T_1 = \frac{Lr_1}{v} = \frac{L_1}{V} \tag{7}$$

$$T_2 = T_1 + \frac{Lr_2}{v} = T_1 + \frac{L_2}{V} \tag{8}$$

$$Te = \frac{RL}{v} \tag{9}$$

A timer is reset to zero and starts to count when the scan unit 103 of the reader 100 posses through the point $R_0$. The timer counts when the scan unit 103 passes through the points $R_1$, $R_2$ and RE, that, when the number of pulses of the encoder of the scan unit 103 counted from the point $R_0$ reaches $Ln_1$, $Ln_1 + Ln_2$ and NL are represented by $t_1$, $t_2$ and te, respectively. The counts $t_1$, $t_2$ and te are compared with the reference times $T_1$, $T_2$ and Te, respectively. Allowable errors are given to the reference times so that the counts $t_1$, $t_2$ and $te$ are compared with $T_1 \pm \Delta T_1$, $T_2 \pm \Delta T_2$ and $Te \pm \Delta Te$, respectively, to detect the passage of the scan unit 103 of the reader 100 through the points $R_1$, $R_2$ and RE.

Figure 4A:
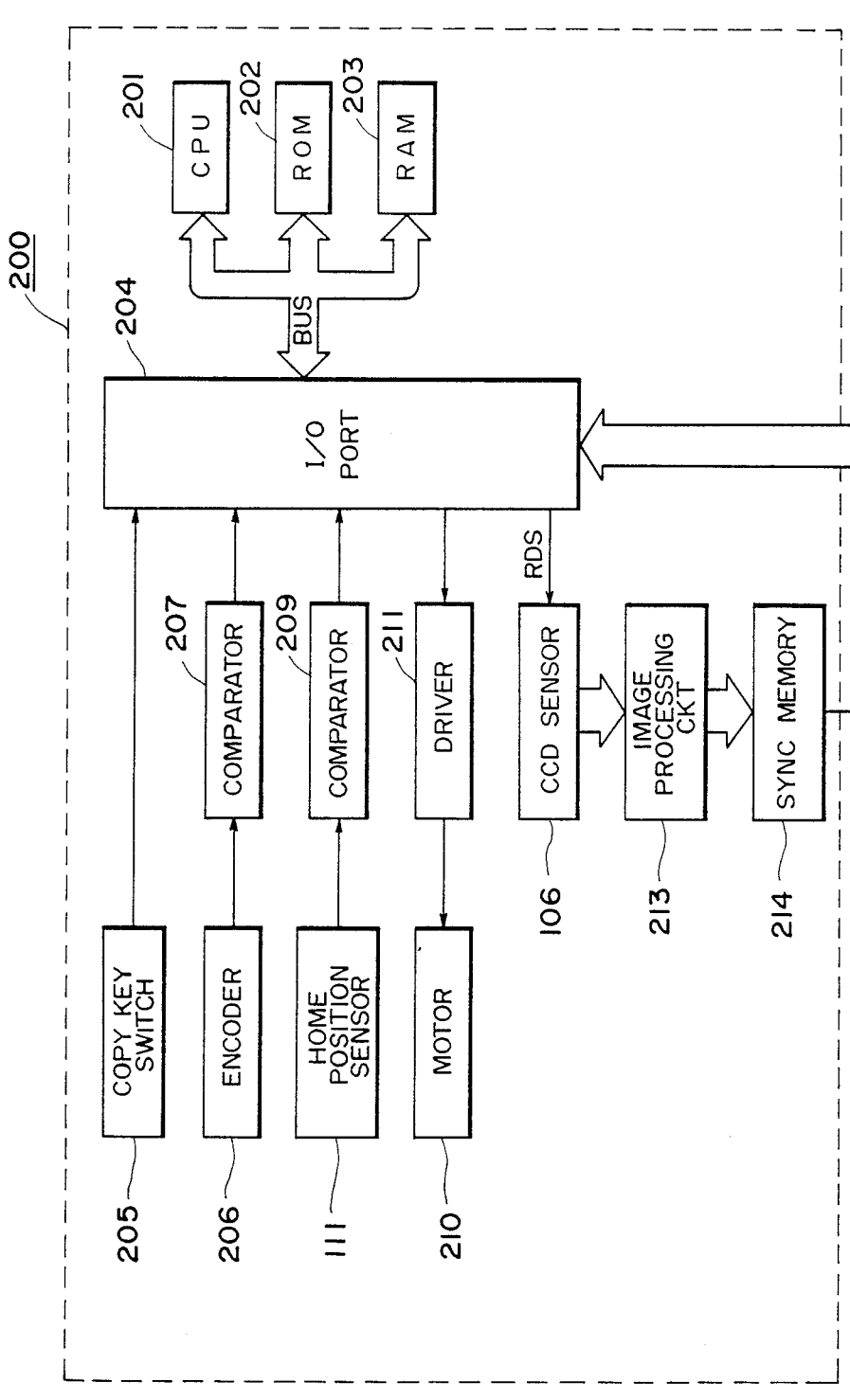

FIG. 4 shows a circuit configuration of the control unit of the image forming apparatus shown in FIG. 1. Numeral 200 denotes a control block for the reader 100 and numeral 300 denotes a control block for the printer 50. Control information are exchanged between the blocks through I/O ports 204 and 304.

In the control block 200 for the reader, a controlling CPU 201, a ROM 202 which stores a control procedure and a RAM 203 which stores data are connected to the I/O port 204 through a bus. A copy start signal from a copy button switch 205 to command the start of copy, a signal from a home position sensor 111 which detects the home position, and a signal from an encoder 206 which detects the distance of movement of the scan unit 103 are digitized by comparators 207 and 209 and the digitized signals are supplied to the I/O port 204. The encoder 206 generates a pulse signal in synchronism with the scan of the scan unit 103. Accordingly, the scan position of the scan unit 103 can be detected by counting the pulses emitted by the encoder 206.

On the other hand, the output signal from the I/O port 204 of the reader drives a drive motor 210 for the scan unit 103 through a driver 211, and a document read command RDS from the I/O port 204 is supplied to the CCD sensor 106. An image signal from the CCD sensor is supplied to an image processing circuit 213 and a synchronous memory 214 and outputted from the control block 200 as a video signal VDS.

In the control block 300 for the printer, a controlling CPU 301, a ROM 302 which stores a control procedure and a RAM 303 which stores data are connected to the I/O port 304 through a bus. A signal from a transfer drum reference position sensor 314 (sensors 21 and 22 in FIG. 1) is digitized by a comparator 315, and the digitized signal is supplied to the I/O port 304. On the other hand, the output signals from the I/O port 304 control a biasing voltage of the developing unit 5 through a driver 308 and a biasing transformer 309, control the transfer charger 8 through a driver 311 and a high voltage transformer 312 and control a developing unit drive motor 317 through a driver 316. A print signal PS from the I/O port 304 is supplied to an AND gate 305 together with the video signal VDS, and the output of the AND gate 305 is converted to a light signal by the semiconductor laser 307 through a driver 306.

FIG. 5 shows a flow chart of a control operation by the CPU 201. The operation of the first embodiment of the image forming apparatus is explained with reference to the flow chart of FIG. 5.

In a step S101, the depression of the copy button switch 205 is monitored. When it is depressed, start of sequence is informed to the CPU 301 of the printer control unit 300 in a step S102, and a counter i in the CPU 201 is initialized to "1" in a step S103. In a step S104, the reader 100 is started to start the scan of the scan unit 103 from the home position RH, and in a step S105, an internal timer of the CPU 201 of the reader is reset to zero at the point $R_0$ based on the output from the encoder 206. This timer is used to detect the elapsed times $t_1$, $t_2$ and te.

In a step S108, reading of a document image by the CCD 106 is started, and in a step S109, an i-th color signal is outputted from the image processing circuit 213. For example, the color signal is yellow for $i=1$, magenta for $i=2$, cyan for $i=3$ and black for $i=4$.

In a step S110, the elapsed time $t_1$ for the first measuring point $R_1$ (see FIG. 3) is detected based on the number of pulses from the encoder 206, and in a decision step S111, if $T_1 - \Delta T_1 > t_1$ or $T_1 + \Delta T_1 < t_1$, that is, if a difference between the measurement $t_1$ and the reference time $T_1$ is larger than the allowable error $\Delta T_1$, a scan error is detected and a step S121 is carried out.

If the measurement $t_1$ is within the range of $T_1 \pm \Delta T_1$ in the step S111, the elapsed time $t_2$ at the second measurement point $R_2$ (see FIG. 3) is detected based on the number of pulses from the encoder 206 in a step S112, and in a step S113, if $T_2 - \Delta T_2 > t_2$ or $T_2 + \Delta T_2 < t_2$, that is, if the difference between the measurement $t_2$ and the reference time $T_2$ is larger than the allowable error $\Delta T_2$, a scan error is detected and a step S122 is carried out.

If the measurement $t_2$ is within the range of $T_2 \pm \Delta T_2$ in the step S113, the elapsed time te at the last point RE (see FIG. 3) is detected based on the number of pulses from the encoder 206 in a step S114, and in a step S115, if $Te - \Delta Te > te$ or $Te + \Delta Te < te$, that is, if the difference between the measurement te and the reference time Te is larger than the allowable error $\Delta Te$, an error routine (not shown) is carried out. In the error routine, error indication and necessary operation to stop the machine are carried out.

If the measurement te is within the range of $Te \pm \Delta Te$ in the step S115, a control signal is sent to the control unit 300 of the printer in a step S116 to move the $(i+1)$th developing unit 5 of the printer to the development position of the photoconductor drum 1. In response to the control signal, the CPU 301 sends a command through the driver 316 to rotate the developing unit 5. When $i=1$, yellow is selected, when $i=2$, magenta is selected, when $i=3$, cyan is selected, when $i=4$, black is selected, and when $i=5$, yellow is selected as is done when $i=1$. Assuming that the yellow developing unit 5-1 has been used $(i=1)$ and the $(i+1)$th developing unit is moved in the step S116, it means that the magenta developing unit 5-2 $(i=2)$ is moved to the development position of the photoconductor drum 1.

In a step S117, the scan table 103 of the reader is returned to the home position, and in a step S118, the count of the counter i is compared with 4. If it is no more than 4, the counter i is incremented by one in a step S119 and the step S104 is repeated again. As the count of the counter i changes to 2, 3 or 4, the color-decomposed signals are sequentially read from the document and the copy processes for magenta, cyan and black are repeatedly carried out. When the content of the counter i is more than 4, the copy process is terminated and the process returns to the initial step S101.

In the error is detected in the step S111 or S113, the process jumps to the step S121 or S122, respectively. In the steps S121 and S122, a control signal is sent to the control unit 300 of the printer to turn off the developing bias of the developing unit 5 and the transfer high voltage of the transfer charger 8. Namely, when the time required to scan in the reader is abnormal by the check at the point $R_1$ or $R_2$ of FIG. 3, the output of the image forming elements on the photoconductor drum 1 is inhibited to inhibit the transfer of the image to the transfer paper (copy paper). If an error is detected before the first measuring point $R_1$ is reached, the developing bias is turned off to prevent the latent image from being developed, and if the error is detected before the second measuring point $R_2$ is reached, the transfer high voltage is turned off to prevent the developed image from being transferred. In a step S123, the CPU 301 of the control block 300 of the printer instructs to stop the normal image formation cycle while the transfer drum 7 is rotated, and in a step S124, reading by the reader 100 is stopped, and in a step S125, the scan table 103 of the reader 100 is returned to the home position. In a step S126, an error counter j and a preset value jc are compared, and if the content of the error counter j (number of times of error) is larger than the preset number jc of times of error, an error routine (not shown) is carried out.

If the error counter j does not exceed the preset value jc, the content of the error counter j is incremented by one in a step S127. In a step S128, the passage of the gripper 7a of the transfer drum 7 through the position at which the transfer drum reference position sensor 314 is arranged is monitored. When the passage is detected by a signal from the control unit 300, the resumption of the image formation cycle is informed to the printer in a step S129, and the process returns to the step S104. Since the counter i is not updated at this time, the reader outputs the same color information and it is developed by the corresponding color.

If a scan error is detected in the reader in the control sequence, the printer does not transfer the image output to the sheet and rotates the transfer drum and outputs the image information of the same color.

In the above description, the time required to produce the preset number of pulses is utilized to check the scan error of the reader. Alternatively, the number of pulses produced in a predetermined time period may be used. In the above description, the positions $R_0$, $R_1$ and $R_2$ on the reader are detected by the number of pulses from the encoder. Alternatively, position sensors may be arranged at those points. Too high or too low scan speed may be detected so that the motor speed is changed by control means in the next scan.

In the present embodiment, a digital read type color copying machine having a digital reader has been explained, although the present invention is applicable to a color copying machine having an analog optical reader.

In the first embodiment described above, the scan speed is always monitored during the plurality of scans, and if an error is detected in the scan speed, the scan is retried so that a color print without color misalignment is produced and the production of low quality print is prevented.

In the first embodiment, if the color misalignment larger than the allowable range is detected in the reader, the image formation cycle in the printer is interrupted as soon as it is detected, and the reader output the image information of the same color, and if the color misalignment is now within the allowable range, the interrupted image formation cycle is resumed to complete the image formation cycle. The color misalignment is indirectly effected by setting the predetermined scan section in the reader and comparing the scan time for that scan section with the reference.

The printer includes the transfer drum. If the color misalignment is detected in the reader, the image formation process, particularly one of development and transfer processes is inhibited, the transfer drum is rotated at least one revolution, and when the next image information is outputted, the printing is effected by the developing unit of the same color as that in the previous cycle.

Figure 6:
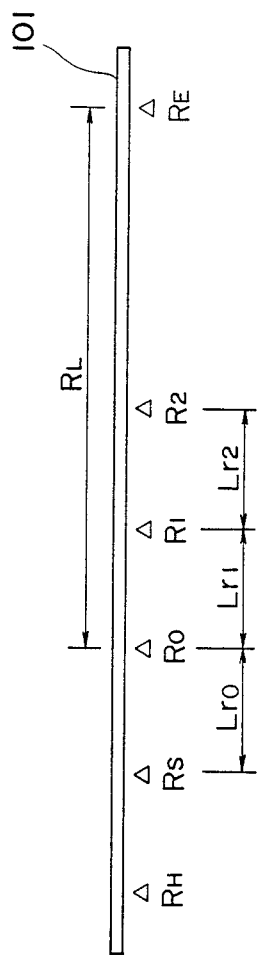
FIG. 6 shows a position of a scan unit in a reader in a second embodiment.

A second embodiment of the present invention is now described. In the second embodiment, reference is also made to FIGS. 1, 2 and 4. FIG. 6 shows a positional relation of the scan unit of the reader 100. The like points to those shown in FIG. 3 are designated by the like symbols. The point RH is the home position which is the stop position for the CCD sensor 106. A point Rs is a reference point located beyond a point at which the scan speed of the scan table 103 of the reader reaches constant. The read start point (leading edge of the document sheet) $R_0$ is spaced from the reference point Rs by $L_{r0}$, the point $R_1$ is spaced from the point $R_1$ by $L_{r1}$ and the point $R_2$ is spaced from the point $R_1$ by $L_{r2}$. The end point RE is spaced from the read start point $R_0$ by RL.

A scan speed of the scan table 103 of the reader is represented by v, and a circumferential speed of the photoconductor drum 1 is represented by V. A time required for the photoconductor drum 1 to move by the distance $L_1$ is represented by $T_{p1}$, and a time required to move by the distance $L_2$ is represented by $T_{p2}$. $T_{p1}$ and $T_{p2}$ are given by $$T_{p1} = L_1/V \qquad (10)$$

$$T_{p2} = L_2/V \qquad (11)$$

On the other hand, a time $T_{r1}$ required for the scan table 103 to move by the distance $L_{r1}$ shown in FIG. 6 and a time $T_3$ required to move by the distance $L_{r2}$ are given by $$T_r = L_{r1}/v \qquad (12)$$

$$T_{r2} = L_{r2}/v \qquad (13)$$

If $T_{p1} = T_{r1}$ and $T_{p2} = T_{r2}$ the followings are met from the formulas (10)–(13)

$$L_{r1} = v/V \cdot L_1 \qquad (14)$$

$$L_{r2} = v/V \cdot L_2 \qquad (15)$$

In the second embodiment, the positions $R_1$ and $R_2$ are selected to meet the relations of the formulas (14) and (15).

The circumferential speed V of the photoconductor drum 1 is usually constant and the scan speed v of the scan table 103 is variable for variable magnification. Accordingly, the points $R_1$ and $R_2$ are not fixed but variable as a function of v. The points $R_1$ and $R_2$ are determined by utilizing the pulses of the encoder which is operated in synchronism with the scan of the scan unit 103. The CPU 201 calculates the distances $L_{r1}$ and $L_{r2}$ based on the magnification and the formulas (14) and (15) and determines the number of pulses $Ln_1$ and $Ln_2$ corresponding to the distances $L_{r1}$ and $L_{r2}$ from a table (not shown) such as a RAM which is addressed by the distances $Ln_1$ and $Ln_2$. The numbers of pulses $Ln_1$ and $Ln_2$ are counted to determine the points $R_1$ and $R_2$.

Since the distances from the home position RH to the read start point $R_1$ and the reference point Rs are known, the numbers of pulses corresponding to those distances are also preset. Accordingly, by counting the pulse from the home position after the start of scan, the points $R_0$ and Rs can be easily detected.

The numbers of pulses produced during the movement by the distances $Lr_0$ and $RL$ are represented by $L_0$ and $NL$, respectively. The scan times from the reference point $Rs$ to the points $R_0$, $R_1$, $R_2$ and $RE$ are represented by $T_0$, $T_1'$, $T_2'$ and $Te'$, respectively. The times $T_0$, $T_1'$, $T_2'$ and $Te'$ are given by $$T_0 = \frac{Lr_0}{v} \tag{16}$$

$$T_1' = T_0 + \frac{Lr_1}{v} = T_0 + \frac{L_1}{V} \tag{17}$$

$$T_2' = T_1' + \frac{Lr_2}{v} = T_1' + \frac{L_2}{V} \tag{18}$$

$$Te' = T_0 + \frac{RL}{v} \tag{19}$$

The timer is reset to zero and starts to count when the scan unit 103 of the reader 100 passes through the reference point Rs. The elapsed times $t_0$, $t_1'$, $t_2'$ and $te'$ for the passage through the points $R_0$, $R_1$, $R_2$ and $RE$, that is, the times required to count the encoder pulses to $Ln_0$, $Ln_0+Ln_1$, $Ln_0+Ln_1+Ln_2$ and $Ln_0+NL$, respectively, are compared with the reference times $T_0$, $T_1'$, $T_2'$ and $Te'$. Allowable errors are given to those reference times to represent $T_0\pm\Delta T_0$, $T_1'\pm T_1'$, $T_2'\pm\Delta T_2'$ and $Te'\pm\Delta Te'$. The measured elapsed times $t_0$, $t_1'$, $t_2'$ and $te'$ are compared with those reference times to determine the passage of the scan unit 103 of the reader 100 through the points $R_0$, $R_1$, $R_2$ and $RE$.

FIG. 7 shows a flow chart of a control operation by the CPU's 201 and 301. The operation of the record embodiment of the image forming apparatus is explained with reference to the flow chart of FIG. 7 and with reference to FIGS. 4 and 6.

In a step S101, the depression of the copy button switch 205 is monitored. When it is depressed, start of sequence is informed to the CPU 301 of the printer control unit 300 in a step S102, and a counter i in the CPU 201 is initialized to "1" in a step S103. In a step S104, the reader 100 is started to start the scan of the scan unit 103 from the home position RH, and in a step S105, an internal timer of the CPU 201 of the reader is reset to zero at the point $R_0$ based on the output from the encoder 206.

In a step S106, the elapsed time $t_0$ for the read start point $R_0$ (see FIG. 6) is determined based on the number of pulses from the encoder 206, and in a decision step S107, if $T_0-\Delta T_0>t_0$ or $T_0\times\Delta t_0$, that is, if the difference between the measurement $t_0$ and the reference time $T_0$ is larger than the allowable error $\Delta T_0$, a scan error is detected and the process branches to a step S120.

If the measurement $t_0$ is within the range of $T_0\pm\Delta T_0$ in the step S107, the reading of the document image by the CCD 106 is started in a step S108, and an i-th color signal is outputted from the image processing circuit 213 in a step S109. For example, yellow is selected when i=1, magenta is selected when i=2, cyan is selected when i=3, and black is selected when i=4.

In a step S110, the elapsed time $t_1'$ for the second measuring point $R_1$ (see FIG. 6) is detected based on the number of pulses from the encoder 206, and in a decision step S111, if $T_1'-\Delta T_1'>t_1'$ or $T_1'+\Delta T_1'<t_1'$, that is, if a difference between the measurement $t_1'$ and the reference time $T_1'$ is larger than the allowable error $\Delta T_1'$, a scan error is detected and a step S121 is carried out.

If the measurement $t_1'$ is within the range of $T_1'\pm\Delta T_1'$ in the step S111, the elapsed time $t_2'$ at the third measurement point $R_2$ (see FIG. 6) is detected based on the number of pulses from the encoder 206 in a step S112, and in a step S113, if $T_2'-\Delta T_2'>t_2'$ or $T_2'+\Delta T_2'<t_2'$, that is, if the difference between the measurement $t_2'$ and the reference time $T_2'$ is larger than the allowable error $\Delta T_2'$, a scan error is detected and a step S122 is carried out.

If the measurement $t_2'$ is within the range of $T_2'\pm\Delta T_2'$ in the step S113, the elapsed time $te'$ at the last point $RE$ (see FIG. 6) is detected based on the number of pulses from the encoder 206 in a step S114, and in a step S115, if $Te'-\Delta Te'>te'$ or $Te'+\Delta Te'<te'$, that is, if the difference between the measurement $te'$ and the reference time $Te'$ is larger than the allowable error $\Delta Te'$, an error routine (not shown) is carried out. In the error routine, error indication and necessary operation to stop the machine are carried out.

If the measurement $te'$ is within the range of $Te'\pm\Delta Te'$ in the step S115, a control signal is sent to the control unit 300 of the printer in a step S116 to move the (i+1)th developing unit 5 of the printer to the development position of the photoconductor drum 1. In response to the control signal, the CPU 301 sends a command through the driver 316 to rotate the developing unit 5. When i=1, yellow is selected, when i=2, magenta is selected, when i=3, cyan is selected, when i=4, black is selected, and when i=5, yellow is selected as is done when i=1. Assuming that the yellow developing unit 5-1 has been used (i=1) and the (i+1)th developing unit is moved in the step S116, it means that the magenta developing unit 5-2 (i=2) is moved to the development position of the photoconductor drum 1.

In a step S117, the scan table 103 of the reader is returned to the home position, and in a step S118, the count of the counter i is compared with 4. If it is no more than 4, the counter i is incremented by one in a step S119 and the step S104 is repeated again. As the count of the counter i changes to 2, 3 or 4, the color-decomposed signals are sequentially read from the document and the copy processes for magenta, cyan and black are repeatedly carried out. When the content of the counter i is more than 4, the copy process is terminated and the process returns to the initial step S101.

If the error is detected in the step S107, S111 or S113, the process jumps to the step S120, S121 or S122, respectively. In the steps S120, S121 and S122, a control signal is sent to the control unit 300 of the printer to turn off the laser 307, the developing bias of the developing unit 5 and the transfer high voltage of the transfer charger 8. Namely, when the time required to scan in the reader is abnormal by the check at the point $R_0$, $R_1$ or $R_2$ of FIG. 6, the output of the image forming elements on the photoconductor drum 1 is inhibited to inhibit the transfer of the image to the transfer paper (copy paper). If an error is detected before the read start point R, the output of the laser 307 is inhibited to prevent the latent image from being formed. If an error is detected before the second measuring point $R_1$ is reached, the developing bias is turned off to prevent the latent image from being developed, and if the error is detected before the third measuring point $R_2$ is reached, the transfer high voltage is turned off to prevent the developed image from being transferred. In a step S123, the CPU 301 of the control block 300 of the printer instructs to stop the normal image formation cycle while the transfer drum 7 is rotated, and in a step S124, reading by the reader 100 is stopped, and in a step S125, the scan table 103 of the reader 100 is returned to the home position. In a step S126, an error counter j and a preset value jc are compared, and if the content of the error counter j (number of times of error) is larger than the preset number jc of times of error, an error routine (not shown) is carried out.

If the error counter j does not exceed the preset value jc, the content of the error counter j is incremented by one in a step S127. In a step S128, the passage of the gripper 7a of the transfer drum 7 through the position at which the transfer drum reference position sensor 314 is arranged is monitored. When the passage is detected by a signal from the control unit 300, the resumption of the image formation cycle is informed to the printer in a step S129, and the process returns to the step S104. Since the counter i is not updated at this time, the reader outputs the same color information and it is developed by the corresponding color.

If a scan error is detected in the reader in the control sequence, the printer does not transfer the image output to the sheet and rotates the transfer drum and outputs the image information of the same color.

In the above description, the time required to produce the preset number of pulses is utilized to check the scan error of the reader. Alternatively, the number of pulses produced in a predetermined time period may be used. In the above description, the positions Rs $R_0$, $R_1$ and $R_2$ on the reader are detected by the number of pulses from the encoder. Alternatively, position sensors may be arranged at those points. Too high or too low scan speed may be detected so that the motor speed is changed by control means in the next scan.

In the present embodiment, the laser is turned off when the scan error is detected at the read start point $R_0$. Since it is an intention to prevent the transfer of the image, the developing bias or the transfer high voltage may be turned off at the point $R_0$.

Figure 8:
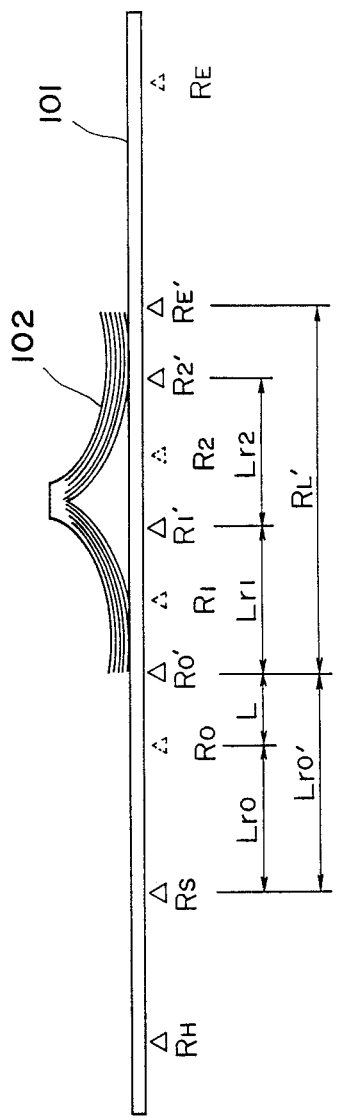
FIG. 8 shows a third embodiment.

The distance $Lr_0$ from the reference point Rs to the read start point $R_0$ need not be constant but it may be determined in accordance with the position of the document sheet as shown in FIG. 8. When the document sheet 102 is placed downstream of the point $R_0$ by the distance L, the read start point $R_0'$ is spaced from the point Rs by $Lr_0'$, that is, $Lr_0+L$. The number of pulses generated between the scan from the point Rs to the point $R_0'$ at the constant speed v is represented by $Ln_0'$. Since the number of pulses $Ln_0$ generated during the scan of $Lr_0$ corresponds to the reference time $T_0'$ required for the scan, a new reference time $T_0$ for $Ln_0'$ is given by $$T_0' = \frac{Ln_0'}{Ln_0} \cdot T_0 \tag{20}$$

an allowable error $\pm \gamma T_0'$ is added to the reference time $T_0'$, and the actual time $t_0'$ required to scan $Lr_0'$ is compared with $T_0' \pm \Delta T_0'$. If the end point of scan is the end point RE′ of the document sheet, the time corresponding to the distance RL′ between $R_0'$ and RE′ and the number of pulses may be detected.

In the above embodiments, if the error in the reader is detected before the reproduced image is actually transferred to the copy sheet, the transfer is inhibited and the same image formation process is repeated. If the error in the reader is detected after the transfer process has been started, the image formation process may be interrupted and the copy sheet may be ejected, and the image formation process may be retried from the beginning.

The present invention is applicable not only to the color copying machine but also to a copying machine having a facsimile function or a sequential page copying function. The sequential page copying function means a function to scan different areas of a document sheet in one scan to produce two images.

The present invention is not limited to the illustrated embodiments but various modifications may be made within the scope of the appended claims.

We claim:

1. An image forming apparatus comprising:
   document scan means for scanning a document a plurality of times to reproduce one image;
   image forming means for forming the image of the document scanned by said document scan means onto a recording medium; and
   control means for controlling said document scan means to reinitiate the scan by said document scan means to complete the image when a scan error of said document scan means is detected,
   wherein said control means includes holding means for holding data associated with the scan in which the scan error occurs, and wherein said control means controls said document scan means on the bass of the held data so that the scans completed before occurrence of the scan error will not be executed again and the scan in which the scan error occurs will be executed again.

2. An image formation apparatus according to claim 1 wherein said image forming means includes a plurality of process means for forming the image, and said control means disables at least one of said plurality of process means to avoid formation of an undesirable image onto the recording medium when the scan error of said document scan means is detected.

3. An image forming apparatus according to claim 1 wherein said control means detects the san error of said document scan means by checking if said document scan means scans a predetermined distance in a predetermined time or not.

4. An image formation apparatus according to claim 1 wherein said control means changes the control modes of said image formation means to avoid formation of an undesirable image onto the recording medium in accordance with a timing of detection of the scan error of said document scan means.

5. An image forming apparatus according to claim 2 wherein said control means selects the process means to be disenabled in accordance with a timing of detection of the scan error of said document scan means.

6. An image forming apparatus comprising:
   document scan means for scanning a document;
   image forming means for forming the image of the document scanned by said document scan means onto a recording medium;
   said image forming means including a plurality of process means for forming the image;
   error detection means for detecting an error in said document scan means; and
   control means for controlling said image forming means,
   wherein said control means includes a plurality of control modes for avoiding formation of an undesirable image onto the recording medium after initiation of the scan by said document scan means, and said control means selects one of the plurality of control modes in accordance with a timing of detection of the scan error of said document scan means.

7. An image forming apparatus according to claim 6 wherein said document scan means scans the document a plurality of times to reproduce one image.

8. An image forming apparatus according to claim 7 wherein said error detection means detects the error by checking if said document scan means scans a predetermined distance in a predetermined time or not.

9. An image forming apparatus according to claim 7, wherein said control means controls said document scan means to reinitiate the scan by said document scan means to complete the image when the scan error of said document scan means is detected,
wherein said control means includes holding means for holding data associated with the scan in which the scan error occurs, and wherein said control means controls said document scan means on the basis of the held data so that the scans completed before occurrence of the scan error will not be executed again and the scan in which the scan error occurs will be executed again.

10. An image forming apparatus according to claim 6 wherein said control means selects the process means to be disenabled to avoid formation of an undesirable image onto the recording medium in accordance with a timing of detection of the scan error of said document scan means.

11. An image forming apparatus comprising:
document scan means for scanning a document;
image forming means for forming the image of the document scanned by said document scan mans onto a recording sheet;
error detection means for detecting an error of said document scan means; and
control means for controlling said image forming means,
wherein said control means selects the control mode for inhibiting the formation of the image onto said recording sheet in accordance with the error status detected by said error detection means, and wherein said control means controls said document scan means to reinitiate the scan to form the image onto said recording sheet without suspension of said apparatus after said inhibition operation on the basis of the detected error status.

12. An image forming apparatus according to claim 1, wherein said control means controls said document scan means to reinitiate only the scan in which an error is detected, so as to complete the image.

13. An image forming apparatus according to claim 1, wherein said image forming means is capable of color image formation and said document scan means is capable of scanning a document a plurality of times to output a plurality of color image data.

14. An image forming apparatus according to claim 9, wherein said control means disenables at least one of said plurality of process means to avoid formation of an undesirable image onto said recording medium when the scan error of said document scan means is detected.

15. An image forming apparatus according to claim 4, wherein said control means is adapted to disenable said apparatus in accordance with a timing of detection of the scan error of said document scan means.

16. An image forming apparatus according to claim 7, wherein said image forming means is capable of color image formation and said document scan means is capable of scanning a document a plurality of times to output a plurality of color image data.

* * * * *

UNITED STATES PATENT AND TRADEMARK OFFICE
CERTIFICATE OF CORRECTION

PATENT NO. : 4,819,025
DATED : April 4, 1989
INVENTOR(S) : YUJI TAKAHASHI ET AL.          Page 1 of 3

It is certified that error appears in the above-identified patent and that said Letters Patent is hereby corrected as shown below:

SHEET 4 OF 10

Figure 4B, "LASEA" should read --LASER-- and "DEVELOPPER" should read --DEVELOPER--. (both occurrences)

SHEET 5 OF 10

Figure 5A:
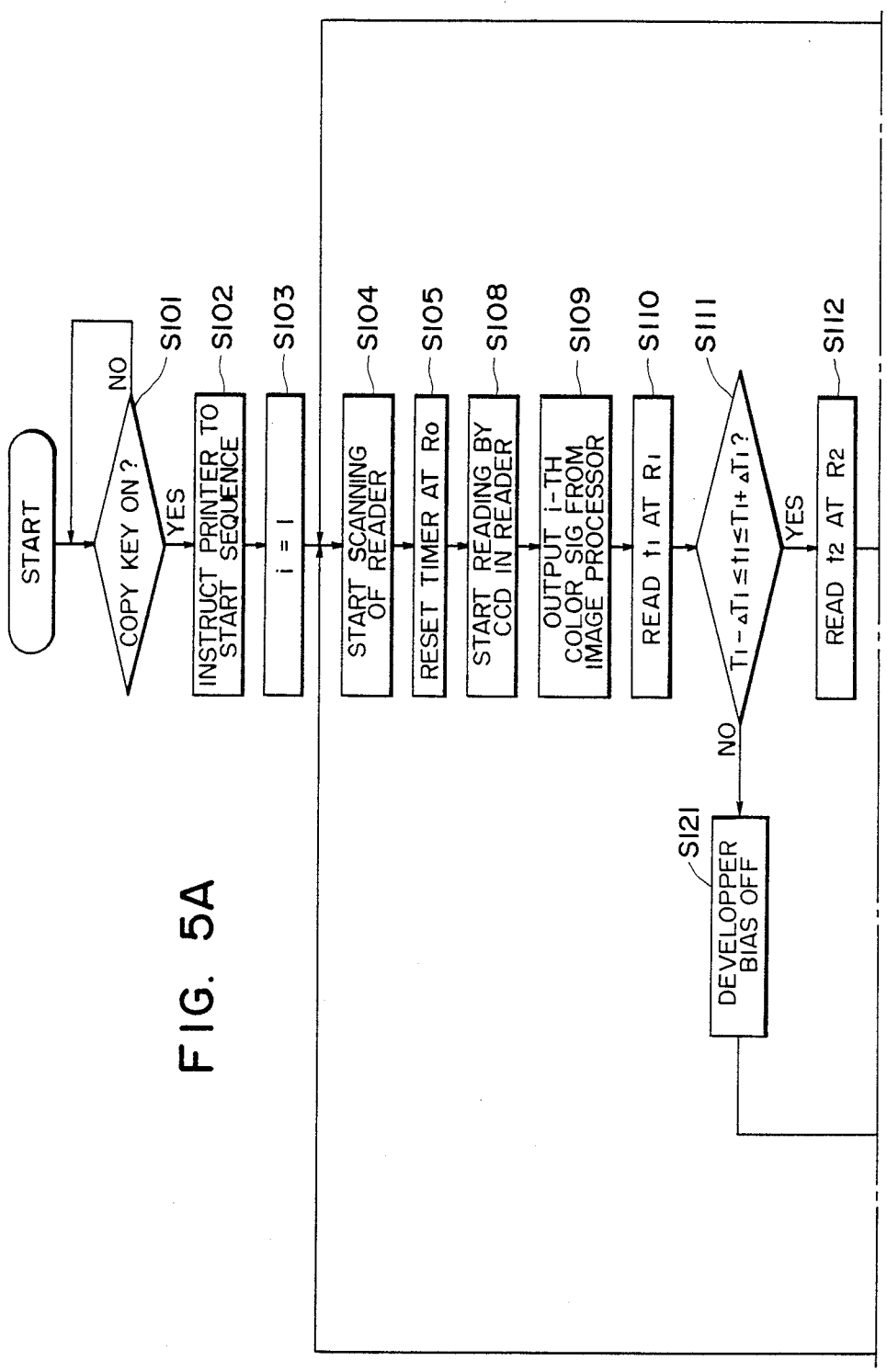

Figure 5A, "DEVELOPPER" should read --DEVELOPER--.

SHEET 6 OF 10

Figure 5B, "DEVELOPPER" should read --DEVELOPER--.

SHEET 8 OF 10

Figure 7A:
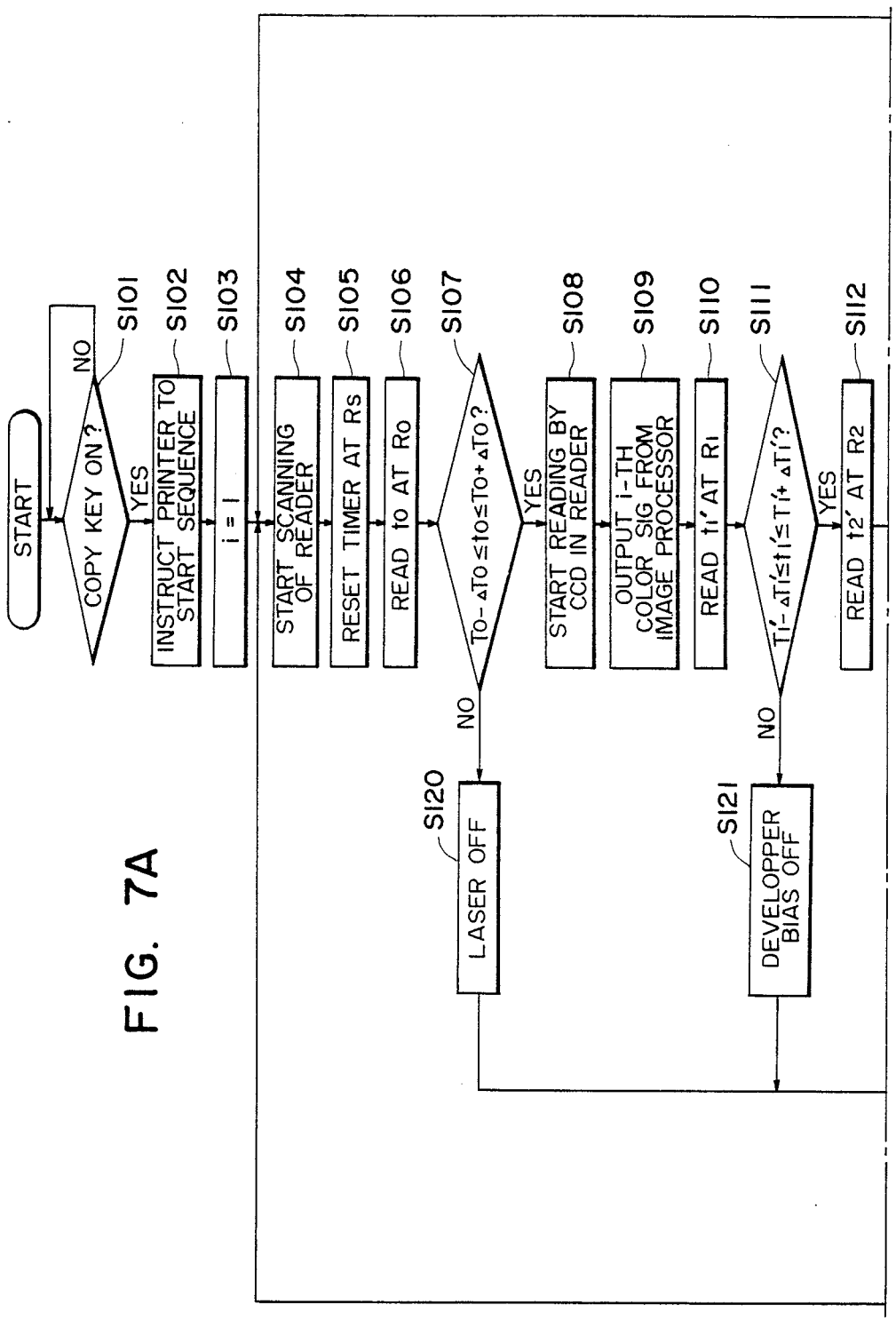

Figure 7A, "DEVELOPPER" should read --DEVELOPER--.

SHEET 9 OF 10

Figure 7B, "DEADING" should read --READING-- and "DEVELOPPER" should read --DEVELOPER--.

COLUMN 2

Line 31, "patent" should read --latent--.

COLUMN 3

Line 61, "R" should read --$R_1$--.

UNITED STATES PATENT AND TRADEMARK OFFICE
CERTIFICATE OF CORRECTION

PATENT NO. : 4,819,025
DATED : April 4, 1989
INVENTOR(S) : YUJI TAKAHASHI ET AL.    Page 2 of 3

It is certified that error appears in the above-identified patent and that said Letters Patent is hereby corrected as shown below:

COLUMN 4

Line 18, "$Lr_1 v/V \cdot L_1$   (5)" should read --$Lr_1 = v/V \cdot L_1$   (5)--.
Line 21, "$Lr_2 v/V \cdot L_2$   (6)" should read --$Lr_2 = v/V \cdot L_2$   (6)--.
Line 42, "$R_1$" should read --$R_0$--.
Line 49, "point $R_1$" should read --point $R_0$--.

COLUMN 8

Line 31, "$T_3$" should read --$Tr_2$--.
Line 34, "$Tr = Lr_1/v$   (12)" should read --$Tr_1 = Lr_1/v$   (12)--.
Line 64, "$R_1$" should read --$R_0$--.

COLUMN 9

Line 3, "$L_0$" should read --$Ln_0$--.
Line 50, "$T_0 X \Delta t_0$," should read --$T_0 + \Delta T_0 < t_0$,--.

COLUMN 11

Line 57, "error$\pm y T_0'$" should read --error $\pm \Delta T_0'$--.

COLUMN 12

Line 27, "bass" should read --basis--.
Line 31, "formation" should read --forming--.
Line 39, "san error" should read --scan error--.
Line 43, "formation" should read --forming--.

UNITED STATES PATENT AND TRADEMARK OFFICE
CERTIFICATE OF CORRECTION

PATENT NO. : 4,819,025
DATED : April 4, 1989
INVENTOR(S) : YUJI TAKAHASHI ET AL.

Page 3 of 3

It is certified that error appears in the above-identified patent and that said Letters Patent is hereby corrected as shown below:

COLUMN 13

Line 36, "mans" should read --means--.

Signed and Sealed this

Twenty-fifth Day of June, 1991

Attest:

HARRY F. MANBECK, JR.

*Attesting Officer*  Commissioner of Patents and Trademarks